United States Patent [19]

Goel

[11] Patent Number: 4,775,728

[45] Date of Patent: Oct. 4, 1988

[54] SAG RESISTANT, HIGH PERFORMANCE, TWO COMPONENT EPOXY STRUCTURAL ADHESIVES

[75] Inventor: Anil B. Goel, Worthington, Ohio

[73] Assignee: Ashland Oil, Inc., Ashland, Ky.

[21] Appl. No.: 18,363

[22] Filed: Feb. 24, 1987

[51] Int. Cl.$^4$ .................... C08G 59/14; C08L 63/02
[52] U.S. Cl. .................................. 525/523; 525/109; 525/113
[58] Field of Search ................. 525/113, 109, 523

[56] References Cited

U.S. PATENT DOCUMENTS 4,025,578  5/1977  Siebert .................... 525/113
4,419,495 12/1983  Davis ...................... 525/113
4,578,424  3/1986  Goel ....................... 525/109

Primary Examiner—Melvyn I. Marquis
Assistant Examiner—Robert E. L. Sellers, II
Attorney, Agent, or Firm—John F. Jones

[57] ABSTRACT

An adhesive composition which results from the mixture of two components, the first component comprising a polyepoxide and the second component comprising a finely dispersed solid salt of a polyamine and a polyphenol in a liquid adduct of a poly(alkylene oxide) polyamine and a polyphenol and the use of this non sagging, high performance adhesive in structural applications is described.

7 Claims, No Drawings

SAG RESISTANT, HIGH PERFORMANCE, TWO COMPONENT EPOXY STRUCTURAL ADHESIVES

This invention relates to two component epoxy adhesive compositions which are sag resistant, have long ambient temperature open time and cure rapidly at moderately elevated temperatures with excellent adhesion performance towards structural substrates comprising as first component a rubber modified epoxy resin having low dilatency and a second component comprising a mixture of a finely dispersed solid salt of a polyamine with a polyphenol in a liquid adduct of a long chain poly(alkylene oxide) di- or triamine with polyphenols and to a process for the manufacture of said compositions.

The two component epoxy adhesives of this invention when mixed have long ambient temperature open time (pot life) and cure readily at moderately elevated temperatures after mixing with excellent adhesion performance towards primed or non-primed structrual substrates such as fiber reinforced plastics including sheet molding compounds (SMC), metals, glass, other ceramics, and the like. Each of the two components of the adhesives of this invention is a stable thixotropic material having low dilatency.

Most of the prior art two component epoxy adhesives are cured by commonly available low molecular weight amine curing agents and are known to have relatively short pot life and the cured adhesives which result from them are usually very stiff, brittle and have low elongation and flexibility, thus showing low energy absorbing properties which might cause problems such as bond deformations (readout) in the adhered substrates such as fiberglass reinforced plastics. Prior art use of flexibilizers, such as polyurethane elastomers or rubbers in two component epoxy adhesives in quantities sufficient to be beneficial, often results in significant increase in the viscosities of the components and loss of some physical performance in the cured adhesive as well as the loss of cure speed for the adhesive. Use of certain combinations of poly(alkylene oxide) polyamines has been described in U.S. Pat. Nos. 3,306,809; 3,645,969 and 4,485,229 to give flexible epoxy polymers. Most of these systems lack several important processing and adhesive performance properties including sag resistance of the mixed adhesive (non flowability of the mixed adhesive when applied to vertical and other non horizontal surfaces of substrates) and long room temperature open time (pot life or use time) and at the same time having the ability to cure rapidly under moderately elevated temperatures. The use of polyamine salts of polyphenolics dispersed in liquid poly(alkylene oxide) polyamine adducts with polyphenolics as hardener in the two component, sag resistant, high performance structural adhesive having several hours to days of ambient terperature open time (pot life) and rapid curing (few minutes) at moderatley elevated temperatures (80° C. to 150° C. and preferably 80° C. to 120° C.)has not heretofore been disclosed in the art for the bonding of structural substrates such as fiberglass reinforced plastics, metals, glass, and the like.

Two component mixtures of epoxy resins and conventional amine curing agents used as adhesives generally have a short ambient temperature pot life, i.e., remain free flowing and uncured for only a short time after the two components are mixed to form the active adhesive and the adhesive compositions based on these polymeric compositions usually exhibit reasonably good adhesion properties toward stiff and high modulus structural substrates such as metals and reinforced composite materials. Such materials usually give rigid, stiff and brittle cured adhesive bonds and generally fail to provide good adhesion bonding with structural substrates having low-to-medium modulus (for instance fiberglass reinforced plastic, FRP and fiber reinforced plastic or SMC). Furthermore, because of the poor flexibility and low elongation properties of these prior art adhesives, they also can cause stress deformation in the bond line between the cured adhesive and the structural substrate particularly when the substrate is a plastic material.

Considerable efforts have been devoted by those skilled in the art to developing flexible epoxy polymer compositions by using additives such as plasticizers, thermoplastics and monoepoxide diluents; however, these usually have resulted in loss of adhesion performance at elevated temperatures as well as having caused processing problems such as increased viscosities and relatively longer curing times. Certain epoxy compositions described in U.S. Pat. Nos. 3,306,809; 3,645,969 and 4,485,229 using long chain poly(alkylene oxide) polyamines as curing agents have been described as being flexible and as providing good adhesion toward metal substrates. Such compositions lack one or more of the desired features of the high performance adhesives useful in automated bonding applications such as bonding of fiberglass reinforced plastic parts to themselves or to other substrates such as metal, glass or ceramic in automotive assembly requiring non sagging properties with long open time at ambient temperatures, fast curing at moderately elevated temperature, and other desirable properties for this type of application.

Some of the more desirable features of two component structural adhesives include:

Individual components of low dilatency and easy pumpability.

Non sagging character of the mixed adhesive bead thickness up to ½ inch immediately after mixing of the two components.

Non critical mix ratios (ratio tolerance in mixing of the two components).

Long ambient temperature (application temperature) open time (pot life), requiring no cleaning or flushing of the mixer for several hours to days. This is to minimize the waste and disposal costs.

Rapid green strength (handling strength of about 50 psi) buildup upon heating at moderately elevated temperatures (below about 120 degrees C.).

No need of rigorous surface preparation (cleaning, scratching, scrubbing, priming, and the like).

High flexibility and tough adhesive bond with high shear and peel strength.

Low hygroscopicity of adhesive.

High heat resistance (ability to remain stable even at 400 degrees F. for one hour).

The present invention provides compositions of two component structural adhesives having sag resistance, ambient temperature open time of several hours to several days and cure rate at moderately elevated temperatures (below 120 degrees C.) of a few minutes. These compositions provide excellent adhesion toward unprimed substrates and possess all of the above-described desirable properties. The adhesive compositions of this invention comprise mixtures of two stable components, namely, (A) an epoxy resin component comprising a polyepoxide which optionally can be modified by reacting partially with a carboxylic acid terminated rubber up to 20% by weight of rubber per weight of the epoxy resin) and optionally blended with a polyurethane elastomer, phenol or oxime blocked isocyanate prepolymer and di- or triglycidyl ether of a poly (alkylene glycol) (up to 15% by weight of the total epoxy resin) and (B) the hardener component or curing agent component which comprises a finely dispersed solid salt (or adduct) of a mono-, di- or polyamine with polyphenol in a liquid adduct of poly(alkylene oxide) polyamine (molecular weight ranging from 200 to 10,000) with a polyphenol in weight ratio of solid salt to liquid adduct of polyphenol-poly(alkylene oxide) polyamine ranging from 5:95 to 60:40 and preferably 10:90 to 50:50 respectively.

Polyepoxides useful in this invention can be monomeric or polymeric, saturated or unsaturated, aliphatic, cycloaliphatic, aromatic or heterocyclic, and they may be substituted if desired with other substituents besides the epoxy groups, e.g., hydroxyl groups, ether radicals, halogen atoms, and the like.

Typical polyepoxides suitable in the practice of this invention include those disclosed in U.S. Pat. Nos. 2,500,600 and 2,324,483 which are incorporated herein by reference. Preferred in this invention are 1,2-epoxy compounds having an epoxide equivalence greater than 1, that is to say, compounds containing more than one group of the formula:

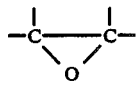

The 1,2-epoxide groups may be either terminal or inner ones. Particularly suitable terminal 1,2-epoxide groups are 1,2-epoxy ethyl or 1,2-epoxy propyl groups. The latter may be linked to an oxygen atom, that is to say, they are glycidyl ether or glycidyl ester groups. Compounds with inner epoxide groups usually contain the 1,2-epoxide group in an aliphatic chain or in a cycloaliphatic ring.

As polyepoxides containing an inner 1,2-epoxy group there are suitable epoxidized diolefins, dienes, or cyclic dienes, such as 1,2,5,6-diepoxy hexane, 1,2,4,5-diepoxy cyclohexane, dicyclopentadiene diepoxide, dipentene diepoxide, vinyl cyclohexene diepoxide, epoxidized diolefinically unsaturated carboxylic acid esters such as methyl-9,10,12,13-diepoxy stearate or the dimethyl ester of 6,7,10,11-diepoxyhexadecane-1,16-dicarboxylic acid. Furthermore, there may be mentioned epoxidized mono-, di-, or polyesters and mono-, di-, or polyacetals containing at least one cycloaliphatic 5-membered or 6-membered ring, to which at least two 1,2-epoxidized groups are linked.

A widely used class of polyepoxides which can be used in the present invention are the epoxy polyethers obtained by reacting a halogen containing epoxide or dihalohydrin, such as epichlorohydrin, epibromohydrin, 3-chloro-1,2-epoxyoctane, and the like with either a polyhydric phenol or a polyhydric alcohol.

The epoxy resin component of this invention may contain from about 2 to 40% by weight of a filler or fillers such as talc, kaolin, aluminum oxide, metal oxides, ferromagnetic fillers, and the like and the thixotropic character can be built up by addition of fumed silica (hydrophobic or hydrophilic) in amounts of from about 1 to 8% by weight. Optionally, additives having hydrogen bondable protons, for instance, glycerine to activate the fumed silica is also within the scope of this invention. Optionally, additional chemical thixotropic materials such as those described in U.S. Pat. No. 4,578,424 may also be included in this component.

In the hardener component the solid salts or adducts are formed from amines including monoalkyl and dialkyl monoamines such as ethyl amine, propylamine, butylamine, cyclohexyl amine, diethylamine, dipropylamine, dicyclohexylamine and the like, alkenyl di- and polyamines such as ethylenediamine, propylene diamine butylene diamine, cyclohexane diamine, bisaminomethyl cyclohexane isophorone diamine, diethylenetriamine, triethylenetetramine, dipropylene triamine, piperazine and the like, mixed primary secondary and tertiary amino group containing amines such as aminoethylpiperazine, bis(aminopropyl)piperazine and the like.

The polyamines useful in forming the solid salt additive curative component of this invention include diamines and may contain any combination of primary, secondary, and tertiary aliphatic or aromatic amine groups. Preferred polyamines are those which when used separately as curatives for epoxy resins are highly reactive, providing rapid cures at room temperature and form solid adducts with polyphenols. The adducts in the curative component of this invention permit the use of such highly reactive amines as 1,3-propanediamine, ethylenediamine, 1,6-hexamethylenediamine, N,N-dimethyl-1,3-propanediamine, N,N-diethyl-1,3-propanediamine, diethylenetriamine, triethylenetetramine and imino bis(propylamine). Many other polyamines of the foregoing types which may be used will be apparent to those skilled in the art.

The polyphenols useful in formation of the solid adduct used in the hardener component of this invention include Bisphenol-A, resorcinol, 4,4'-dihydroxy biphenyl, 1,5-dihydroxy naphthalene, 2,4,4-trimethyl-2',4',7-trihydroxy flavan, phenol formaldehyde resins (resole and novolac type polyphenols) and others. The polyamine/polyphenol adducts described in U.S. Pat. Nos. 2,076,707 and 3,520,905 which are i incorporated herein by reference are useful in this invention. U.S. Pat. No. 3,520,905 also describes the use of solid polyamine/polyphenol (flavan salt) as a latent curing agent for single component epoxy compositions. The salts which cure epoxy resins at a reasonably fast rate do not show good shelf life and the salts which provide long shelf life, in fact, require a long time to cure the epoxy resin at elevated temperature and are not suitable for rapid adhesive bonding application described herein. In other words, the prior art describes one component adhesive systems having long shelf life which do not cure rapidly and the faster curing systems are not stable at ambient temperatures for more than a few days. Furthermore, the prior art adhesives are stiff and show poor adhesive performance in SMC bonding. The adhesive compositions of this invention are made up of two very stable components having shelf lives of months and they have sag resistance and strong, flexible bonding.

The liquid adducts of long chain poly(alkylene oxide) polyamines and polyphenols essential to the hardener component of this invention are composed of long chain poly(alkylene oxide) polyamines such as those prepared by amination of poly(alkylene oxide) polyols as poly(propylene oxide) di- and tri-amines of molecular weight ranging from 200 to 10,000, and the polyphenols include those disclosed above.

One of the methods for preparing the hardener component of the present invention is to disperse the preformed, finely powdered solid adduct of the polyamine-polyphenol in the liquid adduct of poly(alkylene oxide) di- or triamine (molecular weight ranging from 200 to 10,000)-polyphenol using known dispersing methods including shearing, milling, etc. and the mixture may optionally be filled with fillers such as talc, kaolin, aluminum oxide, powdered metals and metals oxides, etc. and thixotropic fillers such as fumed silica, clays, etc.

A more preferred method for formation of the hardener component is to develop the solid polyamine/polyphenol adduct particles in uniformly dispersed form, in situ, by reacting (adding) the short chain mono-, di- or polyamine in the solution of polyphenol in poly(alkylene oxide)polyamine under continuous shear mixing. The amount of polyphenol dissolved in the poly(alkylene oxide) polyamine is the combined stoichiometric amount of polyphenol needed for the adduct with both the poly(alkylene oxide) polyamine and short chain mono-, di- or polyamine. The advantage of using this method is manifold: (1) it provides a uniform dispersion of finely divided particles of solid polyamine/polyphenol rapidly, (2) it provides an excellent thixotropic paste, thus requiring no need of additional thixotropic materials such as fumed silica and clays which generally are expensive and require good shearing in order go be activated and (3) the process requires no expensive milling equipment which also takes a very long time to give proper dispersion. In this process for preparing the hardener, fillers (up to 40% by weight of the total hardener) may be added either prior to the salt formation or after the salt formation. Optionally, other curing agents and accelerators known in the art may be added to the hardener composition.

The adhesive compositions obtained by mixing the two components of this invention generally provide excellent non sag material and beads of thicknesses up to 0.5 inch may be made without any or little sagging when applied to vertical surfaces. The mixed adhesive materials of this invention show ambient temperature open time ranging from several hours to several days, thus avoiding any need for cleaning of the mixing or application equipment immediately after use. The adhesives of this invention cure rapidly at temperatures in the range of from about 80° to 150° C. and preferably from 100° to 120° C. to give tough, flexible polymers which exhibit excellent adhesive performance under various environmental conditions on structural substrates such as SMC, cold rolled steel, aluminum, ceramics, glass and the like without the need of any preliminary surface preparation of the substrate and can be employed using wide variation in the mix ratios of the epoxide resin component to hardener component.

This invention is further illustrated in the following representative examples.

EXAMPLE 1

This example describes a general procedure for the preparation of adducts (salts) of Bisphenol-A and various polyamines. To the stirred solution of Bisphenol-A in a solvent such as ether or toluene was added dropwise a solution of the polyamine in the same solvent in the proper molar ratio of Bisphenol-A to polyamine. The insoluble solid which formed was separated either by filtration or decantation, was washed with the solvent followed by drying under reduced pressure. In a typical case, 45.6 g of Bisphenol-A was dissolved in 350 ml of diethyl ether. To this solution, under mechanical stirring, was added 12 g of ethylene diamine in 250 ml of diethyl ether. An immediate crystalline solid formed which was isolated by filtration, washed with two separate 50 ml portions of diethyl ether and was then dried under reduced pressure to give a free flowing white powdered solid adduct of Bisphenol-A and ethylenediamine. Other salts described in the following examples which were composed of various other amines and Bisphenol-A were prepared in a similar manner to that just described.

EXAMPLE 2

This example demonstrates that the curing of diepoxide resin with the solid salt of a low molecular weight polyamine and a polyphenolic (e.g., Bisphenol-A) results in a hard, brittle polymer and is for comparative purposes and is outside the scope of this invention. To 10 g of liquid diglycidyl ether of Bisphenol-A modified with 10% by weight of a carboxylic acid group terminated butadiene/acrylonitrile (18% by weight of acrylonitrile in the rubber) Hycar rubber (from BF Goodrich), was dispersed 2.4 g of powdered adduct of Example 1. A 6 g portion of this mixtue was kept at room ethylene diamine/Bisphenol-A prepared by the procedure of temperature and it became partially gelled in about 10 hours. The remaining portion was cured at about 230 degrees F. and gelation occurred within one minute and 40 seconds to give a solid polymer. This polymer was postcured at 280 degrees F. for 30 minutes and the resulting polymer was found to have a Shore hardness "D scale" of 80 and was very stiff (shore D hardness above 70 is too brittle). Any attempt to test this polymer specimen for flexibility resulted in a brittle, shiny break with no showing of any flexibility.

EXAMPLE 3

The liquid adduct of poly(propylene oxide) triamine (molecular weight of about 3100) with Bisphenol-A was prepared by heating the two components in a 7:1 weight ratio, respectively, at 80 degrees C. for about one hour. In a 6 g portion of the resulting liquid adduct was dispersed 2.4 g of the powdered ethylene diamine/Bisphenol-A adduct described in Example 2. The resulting hardener component was mixed with 10 g of liquid diglycidyl ether of Bisphenol-A modified with 10% by weight of the rubber described in Example 2. A 10 g portion of this mixed composition was kept at room temperature for open time determination and it showed partial gellation in about 10 hours at ambient temperature. The remaining portion of the mixture was cured at 230 degrees F. and gelation occurred in about two minutes to give an infusible solid polymer. This polymer was postcured at 280 degrees F. for 30 minutes and the resulting polymer was found to have a Shore hardness D of 45 and was quite flexible. A ⅛ inch thick sheet of the cured polymer could be bent readily without breaking.

EXAMPLE 4

The procedure of Example 3 was followed using 4.9 g of the hardener composition containing 4 g of the liquid adduct of 7:1 (by weight) of poly(propylene oxide) triamine with Bisphenol-A and finely dispersed 0.9 g of powdered ethylene diamine/Bisphenol-A and mixing it with 5 g of the liquid diepoxy resin described in Example 2. The resulting mixture was found to have a room temperature open time of about 12 hours and when heated at 220 degrees F. was found to cure within three minutes to give an infusible polymer. The polymer after postcuring at 280 degrees F. for 30 minutes was found to have a Shore hardness D of 35.

EXAMPLE 5

A 1.5 g sample of the powdered 1:1 molar adduct of aminoethyl piperazine with Bisphenol-A was dispersed in 1.5 g of the liquid adduct of poly(propylene oxide) diamine (molecular weight of about 2000) with Bisphenol-A in an 8:1 weight ratio. The resulting hardener composition was mixed with 5 g of the diepoxy resin described in Example 2 and the mixture was heated at 230 degrees F. Gelation of the heated mixture occurred within two minutes to give a white solid polymer which, after postcuring at 280 degrees F. for 30 minutes was found to have a Shore D hardness of 55. In comparison, when the epoxy resin was cured with the solid aminoethyl piperazine/Bisphenol-A adduct alone in a one-component system, the resulting polymer (which is outside the scope of the present invention) had a Shore D hardness of 78 and was brittle.

EXAMPLE 6

This example describes another procedure for the preparation of the hardener component useful in the two component structural adhesives of this invention. The mixture of liquid adducts of long chain poly(propylene oxide) polyamine with Bisphenol-A was prepared by dissolving 9 parts by weight of Bisphenol-A in 60 parts by weight of poly(propylene oxide) triamine (molecular weight 400). To this viscous liquid at room temperature was added 25.4 parts by weight of the powdered 1:1 (molar) adduct of ethylene diamine with Bisphenol-A having a particle size smaller than 100 mesh and the resulting mixture was mixed with shearing for about two hours using a mechanical stirrer operating at a speed of about 1400 rpm. The resulting pasty material was filled with 30 parts by weight of dry talc filler. The resulting pasty hardener was mixed with 1% by weight of hydrophilic fumed silica which provided the thixotropy. This hardener was used in the cure of the epoxy resins as described in the following Examples.

EXAMPLE 7

The epoxy component was prepared by reaction of 63.3 parts by weight of liquid diglycidyl ether of Bisphenol-A (epoxy equivalent weight of about 190) with seven parts by weight of a carboxylic acid terminated butadiene/acrylonitrile rubber (18% by weight of acrylonitrile in the rubber) and blending this with five parts by weight of diglycidyl ether of poly(propylene oxide) diol (epoxy equivalent weight of about 320), 18.7 parts by weight of talc and 6 parts by weight of fumed silica. The resulting mixture was degassed to give a highly viscous pasty material.

EXAMPLE 8

The hardener component having the same chemical materials as that described in Example 6 except that the solid adduct of ethylene diamine with Bisphenol-A was formed in situ, was prepared by using the following method. A solution of 60 parts by weight of poly(propylene oxide) triamine (molecular weight of about 3100), 5.3 parts by weight of poly(propylene oxide) diamine (molecular weight of about 400) and 29.6 parts by weight of Bisphenol-A was prepared by heating the mixture at 80 degrees C. for one hour under constant stirring. To this liquid was added 5.3 parts by weight of ethylene diamine under constant high shear at near room temperature. An immediate white thixotropic paste formed. This paste was filled with 30 parts by weight of dry talc and the mixture was sheared for 15 minutes followed by degassing under reduced pressure to give the thixotropic paste hardener component.

EXAMPLE 9

The following general procedure for the preparation of adhesive bonds was used throughout the Examples herein.

The two components, i.e., the epoxy component and the hardener component, were mixed in appropriate weight amounts at room temperature. The mixed thixotropic adhesive was applied in the form of ⅜ inch beads across the surface of the substrate (usually SMC laminates) which was in the form of a sheet measuring 12 inches by 4 inches by 100 mils (thickness) was dry wiped before the application. After sprinkling a few 30 mils diameter glass beads on top of the adhesive to get a final glue line thickness of 30 mils, a second sheet was then placed on top of the first with adhesive in between and leaving a one inch overlap of the sheets. The resulting structures were then cured in a heated fixture at 230 degrees F. under a pressure of one psi for 3–4 minutes. Test specimens were cut from the cured samples in the form of one inch strips. In this manner several lap shear and side impact test samples were prepared for each adhesive tested.

The following test procedures were carried out using at least three samples for each type of test:
A. Shear strength test at room temperature.
B. Postbaking at 400 degrees F. for an additional one hour and shear strength test at room temperature.
C. Lap shear strength test at 130° F. after immersion for 7 days in 130° F. water.

Several commercially available sheet molding compound (SMC) laminates were tested and the results obtained were found to be similar in each case.

EXAMPLE 10

The hardener composition of Example 6, having no fumed silica (10 g), was mixed with the epoxy component of Example 7 (10 g) for approximately one minute. The resulting paste was found to have some sag when applied to a vertical surface. In order to obtain the thixotropic adhesive bead, 10 g of the hardener component of Example 6 having 1% by weight of fumed silica was mixed with 10 g of the epoxy component of Example 7. The thixotropic material which resulted was found to have room temperature open time of greater than six hours and 230 degree F. cure time of about two minutes. This adhesive was applied to sheet molding compound sheets to form adhesive bonds by the procedure given in Example 9 and lap shear strength testing was carried out. The results of thes test are given in Table 1.

TABLE 1

| Sample No. | Test Procedure | Lap Shear Strength (psi) |
|---|---|---|
| 1 | A | 370 DL |
| 2 | A | 325 DL |
| 3 | A | 310 DL |
| 4 | B | 245 DL |
| 5 | B | 260 DL |
| 6 | B | 315 DL |

TABLE 1-continued

| Sample No. | Test Procedure | Lap Shear Strength (psi) |
|---|---|---|
| 7 | C | 215 DL |
| 8 | C | 240 DL |
| 9 | C | 300 DL |

DL = Substrate Delaminated

EXAMPLE 11

The hardener component of Example 8 (10 g) and the epoxy component of Example 7 (10 g) were mixed to give a non sagging thixotropic structural adhesive. Adhesive bonds were prepared by the procedure of Example 9 and the test results are given in Table 2.

TABLE 2

| Sample No. | Test Procedure | Lap Shear Strength (psi) |
|---|---|---|
| 1 | A | 340 DL |
| 2 | A | 380 DL |
| 3 | A | 340 DL |
| 4 | B | 240 DL |
| 5 | B | 270 DL |
| 6 | B | 300 DL |
| 7 | C | 225 DL |
| 8 | C | 240 DL |
| 9 | C | 310 DL |

EXAMPLE 12

An epoxy component was prepared by following the procedure of Example 7 using 63 parts by weight of liquid diglycidyl ether of Bisphenol-A, 7 parts by weight of a carboxylic acid terminated butadiene/acrylonitrile Hycar rubber, 5 parts by weight of phenol-blocked toluene di-isocyanate prepolymer (blocked NCO of 2.4% by weight), 15 parts by weight of talc, 6 parts by weight of fumed silica and 0.5 parts by weight of glycerine. This thixotropic material was degassed under reduced pressure.

EXAMPLE 13

A hardener component was prepared by following the procedure of Example 8 using 200 g of poly(propylene oxide) diamine (molecular weight of about 4000), 92 g of Bisphenol-A, 80 g of talc and 24 g of ethylenediamine. The resulting thixotropic paste was degassed under reduced pressure.

EXAMPLE 14

The epoxy component of Example 12 (12 g) and hardener component of Example 13 (10 g) were mixed to give a thixotropic paste having excellent non-sag character. This adhesive had open time of about six hours and a 230 degree F. cure rate of two minutes and 10 seconds. The adhesive bonds prepared by following the procedure of Example 9 showed substrate delamination with lap shear strengths of 200 to 400 psi when tested using testing procedures A and B.

EXAMPLE 15

A polyamine/Bisphenol-A adduct was prepared by reacting bis(aminopropyl) piperazine with Bisphenol-A in 1:2 molar ratio in diethyl ether and the adduct was recovered as a white crystal in solid with melting point of 158-160 degrees C. When this salt was mixed with the epoxy resin of Example 2 in the weight ratio of 1:4 salt to resin, the mixture showed room temperature pot life of about two weeks and 230 degrees F. cure rate of two minutes and forty seconds to give a hard polymer which had a Shore D hardness of 80 after postcuring at 280 degrees F. for 30 minutes.

EXAMPLE 16

A hardener component was prepared by following the procedure of Example 6 using 58 g of poly(propylene oxide) triamine (molecular weight 3100), 7 g of poly(propylene oxide) diamine (molecular weight of 400), 10.5 g of Bisphenol-A and 25 g of the bis(aminopropyl) piperazine/Bisphenol-A adduct of Example 15. The pasty material was filled with 43 g of talc. The resulting hardener component, when mixed with the epoxy resin component of Example 7 (1:1 by weight ratio), had poor non-sag properties indicating the need for a thixotropic additive such as fumed silica or preparation of solid adduct in situ as in example 8. The adhesion testing was carried out by following the procedure of example 9 and the results are given in Table 3.

TABLE 3

| Sample No. | Test Procedure | Lap Shear Strength (psi) |
|---|---|---|
| 1 | A | 360 DL |
| 2 | A | 370 DL |
| 3 | A | 370 DL |
| 4 | B | 290 DL |
| 5 | B | 300 DL |
| 6 | B | 320 DL |
| 7 | C | 200 DL |
| 8 | C | 340 DL |
| 9 | C | 325 DL |

EXAMPLE 17

A hardener component was prepared by following the procedure of Example 8 using 60 parts by weight of poly(propylene oxide) triamine (molecular weight 3100), 5.3 parts by weight of poly(propylene oxide) diamine (molecular weight 400), 30 parts by weight of Bisphenol-A, 5 parts by weight of bis(aminopropyl) piperazine and 30 parts by weight of talc. The resulting thixotropic pasty hardener (10 g) was mixed with the epoxy component of Example 12 to give a non thixotropic adhesive which had room temperature open time of several days (greater than 3 days) and 230 degree F. cure speed of about 3 minutes and 30 seconds. Test results for tests carried out using this adhesive in accordance with the procedure of Example 9 are given in Table 4.

TABLE 4

| Sample No. | Test Procedure | Lap Shear Strength (psi) |
|---|---|---|
| 1 | A | 440 DL |
| 2 | A | 380 DL |
| 3 | A | 320 DL |
| 4 | B | 300 DL |
| 5 | B | 255 DL |
| 6 | B | 345 DL |
| 7 | C | 250 DL |
| 8 | C | 300 DL |
| 9 | C | 315 DL |

EXAMPLE 18

The procedure of Example 8 was followed using a solution of 48.6 g of Bisphenol-A in 80 g of poly(propylene oxide) triamine (molecular weight 3100) and 10 g of poly(propylene oxide) diamine (molecular weight of about 400) and filling the resulting mixture with 40 g of dry talc followed by dropwise addition of 4.6 g triethylenetetramine under high speed shear. A white thixotropic pasty material formed. This hardener component was mixed with the epoxy component of Example 12 in 1:1 weight ratio to give a thixotropic adhesive composition having excellent non-sag character. The resulting adhesive was found to have a room temperature open time of more than one day and a 230 degrees F. cure rate of three minutes and thirty seconds. Adhesive bonds were prepared following the procedure of Example 9 using unprimed fiberglass reinforced polyester substrates (SMC), and lap shear strengths were tested as in Example 9. The results of these tests are given in Table 5.

TABLE 1

| Sample No. | Test Procedure | Lap Shear Strength (psi) |
|---|---|---|
| 1 | A | 430 DL |
| 2 | A | 450 DL |
| 3 | A | 405 DL |
| 4 | B | 350 DL |
| 5 | B | 360 DL |
| 6 | B | 380 DL |

I claim:

1. A two component epoxy resin adhesive composition comprising a first polyepoxide component and a second curing component consisting essentially of a finely dispersed solid salt of a polyamine and a polyphenol, said polyamine being at least one member selected from the group consisting of 1,3-propanediamine, ethylene diamine, 1,6-hexamethylene diamine, N,N-diethyl-1,3-propanediamine, diethylene triamine, triethylene tetramine and imino bis(propylamine) in a liquid adduct of a poly (alkylene oxide) polyamine and a polyphenol.

2. The composition of claim 1 wherein the polyepoxide is one containing more than one group of the formula

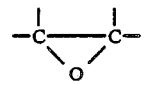

3. The composition of claim 2 wherein the poly(alkylene oxide) polyamine has a molecular weight of from 200 to 10,000.

4. The compoition of claim 3 wherein the weight ratio of the polyamine polyphenol salt to the liquid adduct of the poly(alkylene oxide) polyamine-polyphenol in the second component is in the range of from 5:95 to 60:40.

5. The composition of claim 4 wherein the poly(alkylene oxide) polyamine in the second component is one prepared by the amination of poly(alkylene oxide) polyols and is selected from the group consisting of poly(propylene oxide) diamines and polypropylene oxide triamines.

6. The composition of claim 5 wherein the solid salt of the second component is the salt of ethylene diamine/Bispheonol-A and the liquid adduct is the adduct of poly(propylene oxide) triamine and Bisphenol-A.

7. The composition of claim 5 wherein there is also included in the first component the diglycidyl ether of poly(propylene oxide) diol.

* * * * *